United States Patent
Gupta et al.

(10) Patent No.: US 8,589,632 B1
(45) Date of Patent: Nov. 19, 2013

(54) ARBITRATION METHOD FOR PROGRAMMABLE MULTIPLE CLOCK DOMAIN BI-DIRECTIONAL INTERFACE

(75) Inventors: Sumeet Gupta, San Jose, CA (US); Hamid Khodabandehlou, Milpitas, CA (US); Pradeep Bajpai, San Jose, CA (US); Syed Babar Raza, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1418 days.

(21) Appl. No.: 12/044,862

(22) Filed: Mar. 7, 2008

Related U.S. Application Data

(60) Provisional application No. 60/906,052, filed on Mar. 9, 2007, provisional application No. 60/934,778, filed on Jun. 14, 2007.

(51) Int. Cl.
*G06F 12/00* (2006.01)

(52) U.S. Cl.
USPC ............... 711/147; 711/137; 710/52

(58) Field of Classification Search
USPC ..................... 711/147, 137; 710/52
See application file for complete search history.

(56) References Cited

U.S. PATENT DOCUMENTS

| | | | |
|---|---|---|---|
| 4,899,352 A | 2/1990 | Cucchi et al. | |
| 5,822,776 A | 10/1998 | De Korte et al. | |
| 6,005,795 A | 12/1999 | Hawkins et al. | |
| 6,005,796 A | 12/1999 | Sywyk et al. | |
| 6,181,595 B1 | 1/2001 | Hawkins et al. | |
| 6,262,912 B1 | 7/2001 | Sywyk et al. | |
| 6,731,566 B1 | 5/2004 | Sywyk et al. | |
| 6,970,978 B1 * | 11/2005 | Wu | 711/137 |
| 7,016,349 B1 | 3/2006 | Raza et al. | |
| 7,193,994 B1 | 3/2007 | Payson | |
| 7,242,686 B1 | 7/2007 | Dougherty et al. | |
| 2001/0014053 A1 | 8/2001 | Li | |
| 2001/0044885 A1 * | 11/2001 | LaBerge | 711/158 |
| 2002/0010897 A1 | 1/2002 | Stark | |
| 2004/0039938 A1 | 2/2004 | Katz et al. | |
| 2004/0064649 A1 * | 4/2004 | Volpe et al. | 711/137 |
| 2004/0073697 A1 * | 4/2004 | Saito et al. | 709/233 |
| 2005/0033875 A1 * | 2/2005 | Cheung et al. | 710/29 |

* cited by examiner

*Primary Examiner* — Jared Rutz

(57) ABSTRACT

An embodiment of the present invention is directed to a system including a memory interface logic unit for receiving memory access requests and corresponding information, a processor coupled to the memory interface logic, a plurality of pre-fetch buffers for handling memory accesses coupled to the memory interface logic unit, an arbiter logic unit for pre-fetching data into the plurality of pre-fetch buffers, a memory device for storing data coupled to the arbiter logic unit and the plurality of pre-fetch buffers, and busy detection logic for informing the arbiter logic unit of the current operation of the processor. The arbiter logic unit facilitates memory access via pre-fetch buffers of the processor and the memory in different or independent clock domains. The arbiter logic further allows random access without introducing additional latency.

22 Claims, 5 Drawing Sheets

ARBITRATION METHOD FOR PROGRAMMABLE MULTIPLE CLOCK DOMAIN BI-DIRECTIONAL INTERFACE

RELATED U.S. APPLICATIONS

This application claims the benefit of and priority to the copending provisional patent application Ser. No. 60/906,052, entitled "Arbitration Architecture For Bi-Directional Memory Interface in a Multiple Clock Domain Application," with filing date Mar. 9, 2007, and hereby incorporated by reference in its entirety.

This application claims the benefit of and priority to the copending provisional patent application Ser. No. 60/934,778, entitled "Arbitration Method For Programmable Multiple Clock Domain Bi-Directional Interface," with filing date Jun. 14, 2007, and hereby incorporated by reference in its entirety.

REFERENCE TO CO-PENDING APPLICATIONS FOR PATENT

The present application for patent is related to the following co-pending u.s. patent application:

Ser. No. 12/044,831, titled "BUSY DETECTION LOGIC FOR ASYNCHRONOUS COMMUNICATION PORT" by Raza et al, filed Mar. 7, 2008, assigned to the assignee hereof, and expressly incorporated by reference herein.

FIELD OF INVENTION

Embodiments of the present invention relate to multiple clock domain systems.

BACKGROUND OF THE INVENTION

Many conventional interface designs require both devices connected to either side of the interface to be in the same clock domain. For example, a processor and memory device may be required to be synchronized to the same clock in order for the processor to reliably access the memory. Clock synchronization is further required when there is a bidirectional interface between the two devices.

As a result, devices need to be in the same domain and thus must operate at higher frequencies as technology advances and the devices become faster. Therefore, it can be costly to pair devices (e.g., processor and memory) suitable for and operating in the same clock domain.

Prior art solutions have multiple clock domains have introduced additional latency or synchronization uncertainty and required first in first out (FIFO) access. The additional latency is often a result of one clock domain being slower than the other clock domain and the time required to synchronize. The difference in clock domains may also require FIFO access because operations in the faster domain need to wait for the operations in the slower domain.

SUMMARY OF THE INVENTION

Accordingly, embodiments of the present invention are directed to an apparatus for synchronizing device communications in different or independent clock domains without introducing additional latency or synchronization uncertainties. Embodiments of the present invention may allow a processor in a first domain to read and write to a memory device in a second independent clock domain.

In one embodiment, the pre-fetch buffers are shallow first in first out (FIFO) buffers used to: store pre-fetch data for read allowing low latency read operations upon request from the external interface to read data from a memory interface; temporarily store write data before the arbiter pulls the data and stores it in the large endpoint memory; and handle clock domain crossing. An arbiter logic is included that services the endpoints in the following order: (1) service external interface request: pre-fetches data from end point memory for read and store it in the pre-fetch buffer memory or pull data from pre-fetch buffers for write; (2) resume service of halted pre-fetch request: service the in-progress pre-fetch request that was halted by the external interface service request; and (3) service simultaneous pre-fetch requests based on ascending or descending port number. A pre-fetch control logic asserts data available interrupt to external asynchronous interface, when pre-fetch is completed. The arbiter also performs suspend and resume pre-fetching functions and also handles zero length packets. A busy detection logic is also included that is an independent busy logic for each endpoint.

More specifically, an embodiment of the present invention is directed to a system including a memory interface logic unit for receiving memory access requests and corresponding information, a processor coupled to the memory interface logic, a plurality of pre-fetch buffers for handling memory accesses coupled to the memory interface logic unit, an arbiter logic unit for pre-fetching data into the plurality of pre-fetch buffers, a memory device for storing data coupled to the arbiter logic unit and the plurality of pre-fetch buffers and busy detection logic for informing the arbiter logic unit of the current operation of the processor. The arbiter logic unit facilitates memory access via pre-fetch buffers of the processor and the memory in different or independent clock domains.

Another embodiment of the present invention is directed to a method for providing data stored in a memory device including receiving a request for data stored in a memory device from a processor, fetching the data corresponding to the request for data into a pre-fetch buffer, signaling the processor that the data is ready, receiving a request to read the data, and sending data to the processor from the pre-fetch buffer.

Another embodiment of the present invention is direct to a method for storing data in a memory device including receiving a write request from a processor comprising data to be stored in a memory device, storing a portion of the data in a pre-fetch buffer, storing data from the pre-fetch buffer in a memory device as data is received in the pre-fetch buffer from the processor.

DESCRIPTION OF THE INVENTION

Reference will now be made in detail to the preferred embodiments of the claimed subject matter, examples of which are illustrated in the accompanying drawings. While the invention will be described in conjunction with the preferred embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the claims. Furthermore, in the detailed description of the present invention, numerous specific details are set forth in order to provide a thorough understanding of the claimed subject matter. However, it will be obvious to one of ordinary skill in the art that the claimed subject matter may be practiced without these specific details. In other instances, well known methods, procedures, components, and circuits have not been described in detail as not to unnecessarily obscure aspects of the claimed subject matter.

Figure 1:
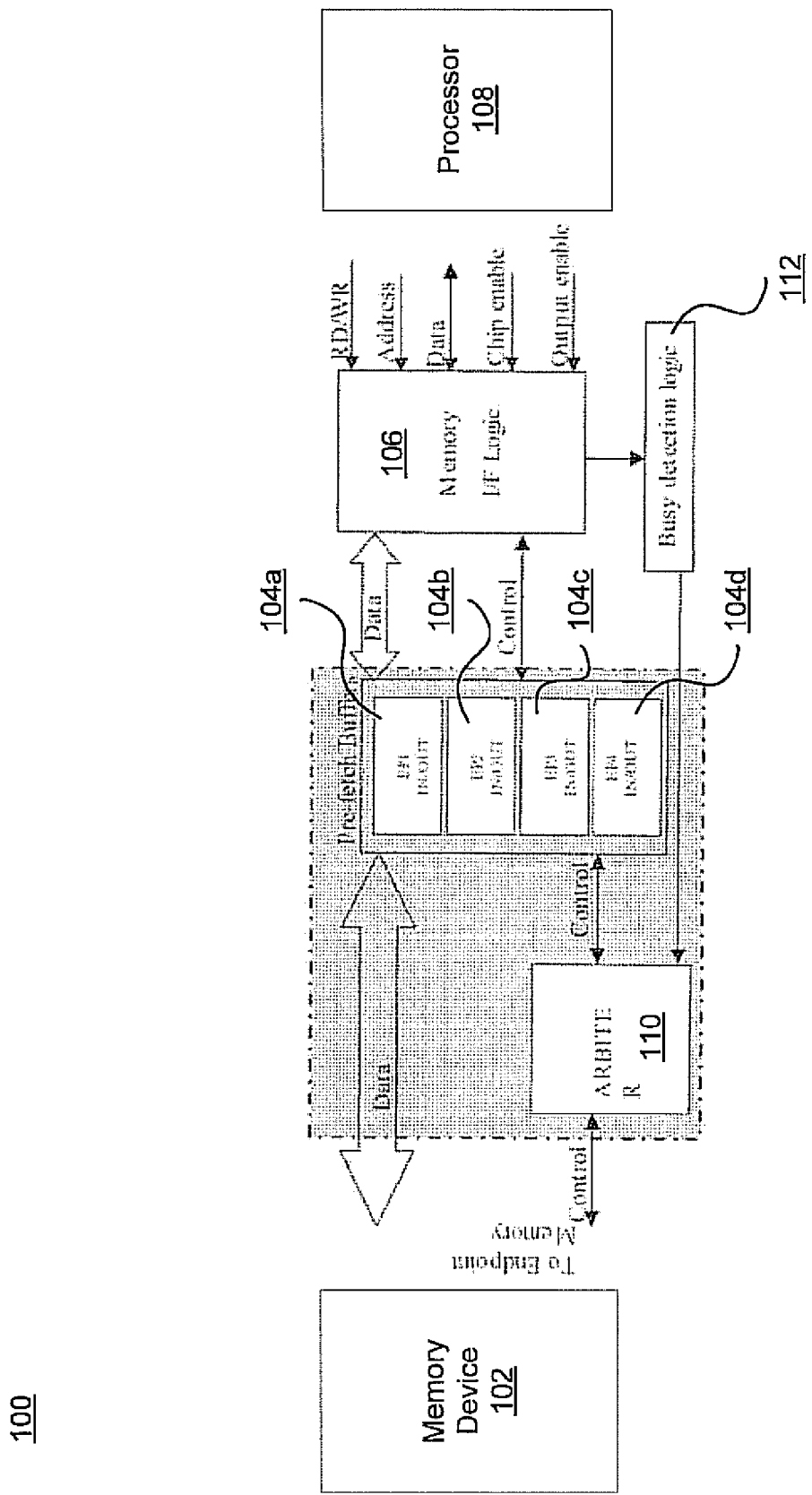
FIG. 1 shows a block diagram of a system for accessing a memory device, in accordance with one embodiment of the present invention.

With reference to FIG. 1, example components used by various embodiments of the present invention are illustrated. It is appreciated that the components in system 100 may operate with other components than those presented, and that not all of the components of system 100 may be required to achieve the goals of system 100. System 100 provides a bidirectional interface for accessing (e.g., read and write) information across clock domains. System 100 includes memory device 102, pre-fetch buffer(s) 104, memory interface logic 106, processor 108, arbiter logic unit 110, and busy detection logic unit 112. Pre-fetch buffers 104 may be assigned to be either input buffers or output buffers. As previously indicated, the present application is related to patent application Ser. No. 12/044,831, filed Mar. 7, 2008, and titled "Busy Detection Logic for Asynchronous Communication Port," by Raza et al., which is incorporated herein by reference for all purposes.

Processor 108 may make requests to access or store data (e.g., read or write) to a bidirectional interface for accessing data stored in memory device 102. In one embodiment, processor 108 and memory device 102 are synchronized to independent or different clocks or clock domains. It is appreciated that processor 108 and memory device 102 could be replaced with any logic circuits or devices in different clock domains and embodiments of the present invention would facilitate communication without additional latency or synchronization uncertainty.

Memory interface logic unit 106 receives requests from processor 108 to access (e.g., read/write) data on memory device 102. In one embodiment, a request from processor 108 may include a read/write signal, a memory address, read/write data, a chip enable signal, and an output enable signal. Memory interface logic 106 forwards data and control information to pre-fetch buffer(s) 104 and to busy detection logic unit 112. Memory interface logic 106 also forwards data and control information from pre-fetch buffer(s) 104 (e.g., during a read). In one embodiment, each pre-fetch buffer of pre-fetch buffer(s) 104 may be associated with a specific memory address. At start-up or initialization, a pre-fetch buffer is assigned to be an input buffer or an output buffer.

Arbiter logic 110 ensures that pre-fetch buffers do not overflow and lose write data or become empty and interrupt the data flow to processor 108. In one embodiment, arbiter logic unit 110 has a frequency that is faster than the read and write rate such that arbiter logic 110 can change the operations of pre-fetch buffer(s) 104 in time to receive or send data from processor 108. For example, when a write operation begins, arbiter logic 110 will start pulling data from the pre-fetch buffer receiving write information from processor 108 so the pre-fetch buffer does not overflow. As another example, when data is being read into a pre-fetch buffer, processor 108 will be notified that data is ready (e.g., assertion of a data available interrupt to external asynchronous interface) and as data is sent to processor 108, arbiter logic 110 ensures that data is added to the pre-fetch buffer so that the data transfer to processor 108 is not interrupted or the pre-fetch buffer becomes empty or dry.

In one embodiment, pre-fetch buffer(s) 104 may be first in first out (FIFO) data buffers. Pre-fetch buffer(s) 104 store pre-fetch data allowing low latency read operations upon request (e.g., from processor 108) from external interface to read data (e.g., from memory device 102) from the memory interface. Pre-fetch buffer(s) 104 also temporarily store write data before arbiter logic 110 pulls the data and stores it in the large end point memory (e.g., memory device 102). Pre-fetch buffer(s) 104 are further used to handle clock domain crossing. Under the control of arbiter logic 110, data may be transferred into pre-fetch buffer(s) 104 at the same rate that data is sent out. For example, during a read operation, as one byte is sent to processor 108 a byte of data from memory device 102 may be transferred into the pre-fetch buffer. In another embodiment, pre-fetch buffer(s) 104 may be shallow buffers and thus take advantage of the faster frequency of arbiter logic 110 so that it can adjust operations of pre-fetch buffer(s) 104 to prevent overflow or emptiness.

Busy Detection Logic Unit 112 signals arbiter logic unit 110 with information on the current operations of processor 108 based on information provided by memory interface logic 106. For example, busy detection logic 112 may signal arbiter logic unit 110 that processor 108 is reading data from a pre-fetch buffer of pre-fetch buffer(s) 104 and arbiter logic 110 will start pre-fetching data from memory device 102 into the pre-fetch buffer processor 108 is reading from. In one embodiment, busy detection logic unit 112 includes independent busy logic for each endpoint or pre-fetch buffer.

Busy detection logic 112 may also signal arbiter logic 110 that processor 108 is beginning a new operation. For example, a read operation may be in progress when processor 108 switches to performing a write operation and busy detection logic 112 signals arbiter logic 110 that the current processor operation has changed. Arbiter logic unit 110 may respond to the change in processor 108 operation by suspending the current pre-fetch operation or pre-fetching of data from memory device 102 into a pre-fetch buffer. Referring to the previous example, upon receiving signaling from the busy detection logic unit 112 that processor 108 has changed operations from a read to a write, arbiter logic 110 will suspend the operation on the pre-fetch buffer being used to load data into the pre-fetch buffer and will activate another pre-fetch buffer to begin receiving the data from processor 108 to be written to memory device 102.

After completing operations that interrupted a pre-fetch buffer operation, arbiter logic 110 may resume or complete the operation that was interrupted. Referring to the above examples, after processor 108 signals that all write data has been sent and the writing of data to memory device 102 is complete, arbiter logic 110 may resume the pre-fetch buffer operation of reading data from memory device 102. Arbiter logic 110 may complete a pre-fetch buffer operation by resuming from where the transfer was interrupted by storing information so that no data needs to be retransferred to or from a pre-fetch buffer.

In one embodiment, arbiter logic 110 may follow a policy or hierarchy in selecting the order which pre-fetch buffer operations are to be resumed or performed. For example, arbiter logic 110 may first service requests from processor 108, then any pre-fetching that was interrupted by a processor request, and then any simultaneous pre-fetching requests based on the a number assigned to each pre-fetch buffer (e.g., ascending or descending order). Similarly, when simultaneous requests are received from processor 108, arbiter logic unit 110 may handle the requests based on a number assigned to each pre-fetch buffer.

In one embodiment, pre-fetch buffer(s) 104 may be programmed or configured as input or output pre-fetch buffers. The configuration of pre-fetch buffers may be based on the application being performed by system 100. When a pre-fetch buffer is configured as an input buffer the buffer is configured for write operations. When a pre-fetch buffer is configured as an output buffer, the buffer is configured for read operations. In one embodiment, pre-fetch buffer(s) 104 can be configured at boot time of the system. In another embodiment, pre-fetch buffer(s) 104 can be configured dynamically.

In one embodiment, system 100 may be configured for universal serial bus (USB) communication. Pre-fetch buffer(s) 104 may be configured based on being used to interact with a USB device. For example, each pre-fetch buffer may be associated with a USB virtual channel or end point. Arbiter logic 110 may acknowledge that a zero length packet is being received and inform processor 108. In another embodiment, processor 108 will inform arbiter logic 110 that a zero length packet has been received and arbiter logic 110 will take the control information in the zero length packet and pass it onto the control logic which is interfacing with the USB device.

Figure 2:
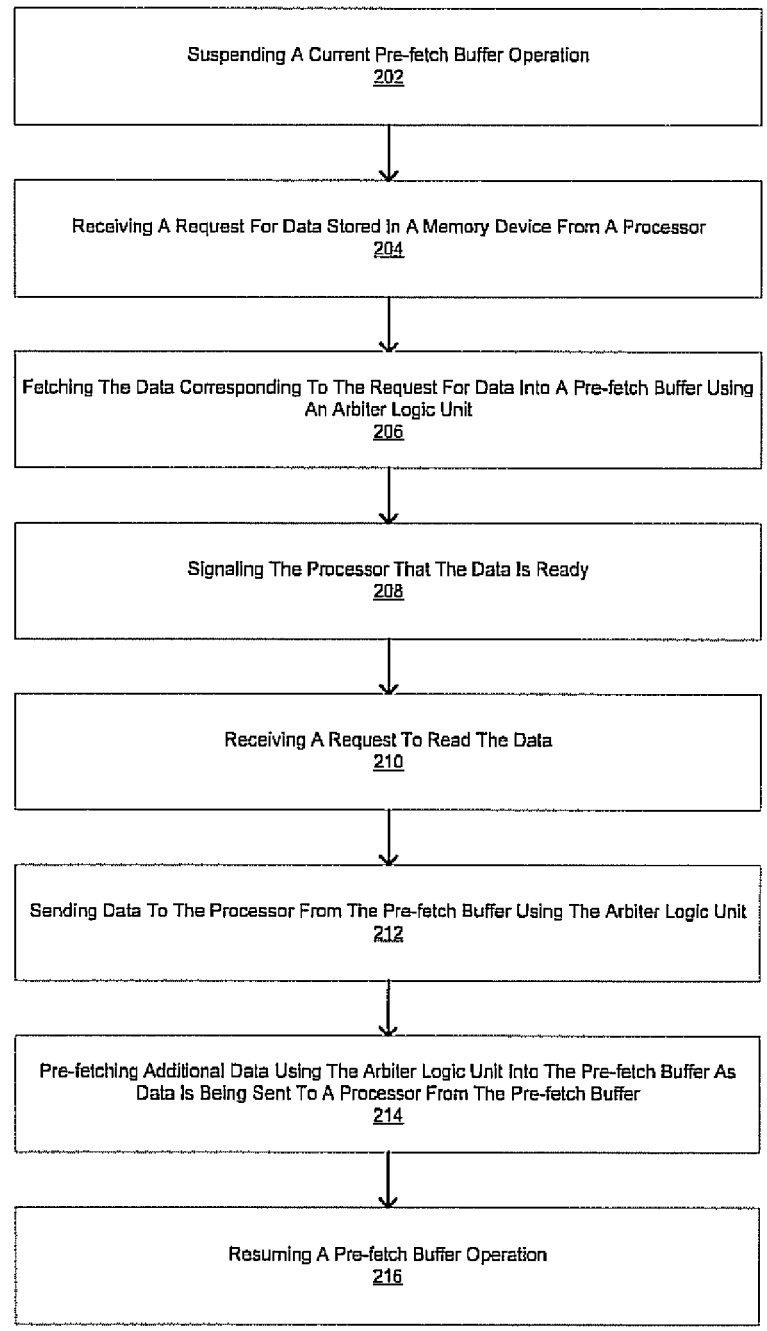
FIG. 2 shows an exemplary process for retrieving data stored in a memory device, in accordance with one embodiment of the present invention.

FIG. 2 is a flowchart 200 of an exemplary process for retrieving data stored in a memory device, in accordance with one embodiment of the present invention. The blocks of flowchart 200 may be carried out with a plurality of devices such as a processor and memory or other devices and logic circuits in independent clock domains.

At block 202, a current pre-fetch buffer operation is suspended. As described herein, a pre-fetch buffer read or write operation may be suspended upon receiving a signal from busy detection logic indicating that a processor is switching tasks.

At block 204, a request for data stored in a memory device from a processor is received. The request may be a memory read request as described herein.

At block 206, data corresponding to the request for data is fetched into a pre-fetch buffer using an arbiter logic unit. As described herein, the data may be fetched from a memory device under the control of arbiter logic unit into a pre-fetch buffer.

At block 208, the processor is signaled that the data is ready. As described herein, once sufficient data has been loaded into a pre-fetch buffer the processor is signaled that there is data ready to be retrieved.

At block 210, a request to read the data is received. As described herein, the processor after being signaled the data is ready may signal (via memory interface logic) that it is ready to receive the data.

At block 212, data is sent to the processor from the pre-fetch buffer using the arbiter logic unit. As described herein, data begins to be sent from a pre-fetch buffer (via memory interface logic) to a processor under the control of the arbiter logic unit.

At block 214, additional data is pre-fetched using the arbiter logic unit into the buffer as data is sent from the pre-fetch buffer to the processor. As described herein, arbiter logic pre-fetches additional data to a pre-fetch buffer as data is sent to the processor (via memory interface logic) to complete the data transfer and ensure the pre-fetch buffer does not become empty.

At block 216, the interrupted pre-fetch buffer operation is resumed. As described herein, arbiter logic may resume the previously interrupted pre-fetch operation when the read request was received.

Figure 3:
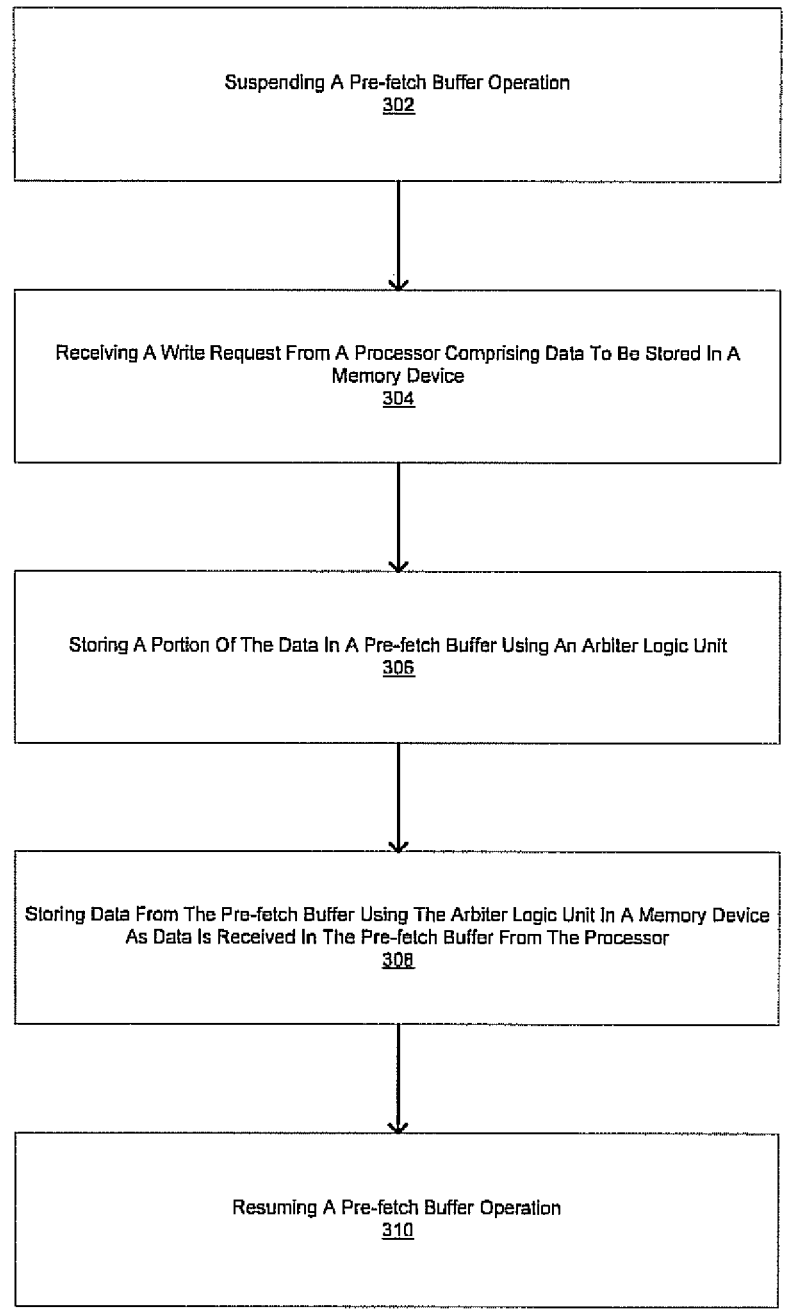
FIG. 3 shows an exemplary process for storing data in a memory device, in accordance with another embodiment of the present invention.

FIG. 3 is a flowchart 300 of an exemplary process for storing data in a memory device, in accordance with one embodiment of the present invention. The blocks of flowchart 300 may be carried out with a plurality of devices such as a processor and memory or other devices and logic circuits in independent clock domains.

At block 302, a pre-fetch buffer operation is suspended. As described herein, a pre-fetch buffer read or write operation may be suspended upon receiving a signal from busy detection logic indicating that a processor is changing tasks.

At block 304, a write request is received from a processor comprising data to be stored in a memory device. As described herein, a write request may be received by arbiter logic via memory interface logic.

At block 306, a portion of data is stored in a pre-fetch buffer using an arbiter logic unit. As described here, under the control of arbiter logic the data portion of the write request begins to be stored in a pre-fetch buffer.

At block 308, using the arbiter logic unit data from the pre-fetch buffer is stored in a memory device as data is received in the pre-fetch buffer from the processor. As described herein, arbiter logic starts writing to a memory device from the pre-fetch buffer while write data is being received from the processor into the pre-fetch buffer.

At block 310, a pre-fetch buffer operation is resumed. As described herein, arbiter logic may resume the previously interrupted pre-fetch operation when the write request was received.

Figure 4A:
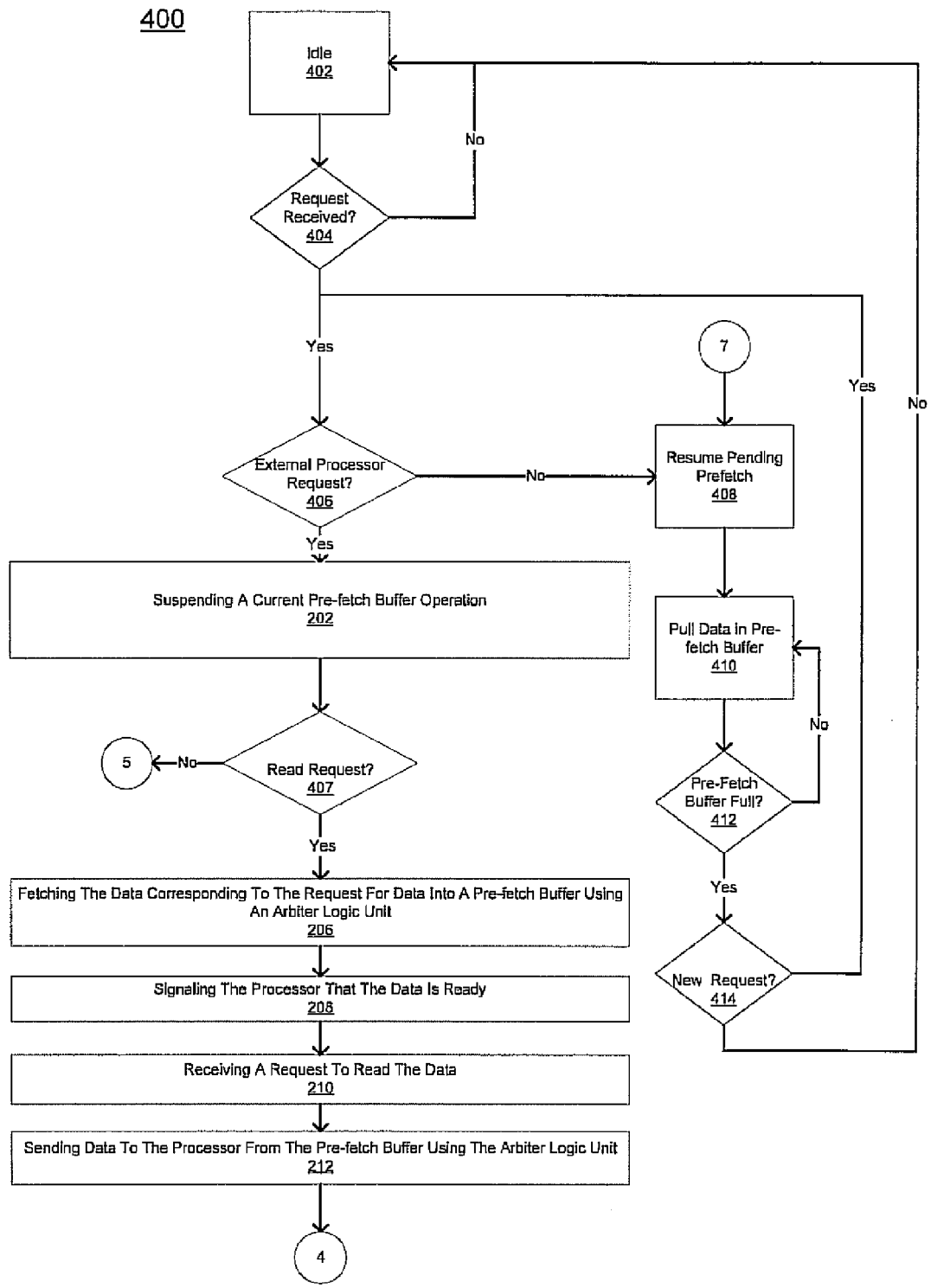
FIGS. 4A-4B show exemplary operations of systems, in accordance with embodiments of the present invention.
Figure 4B:
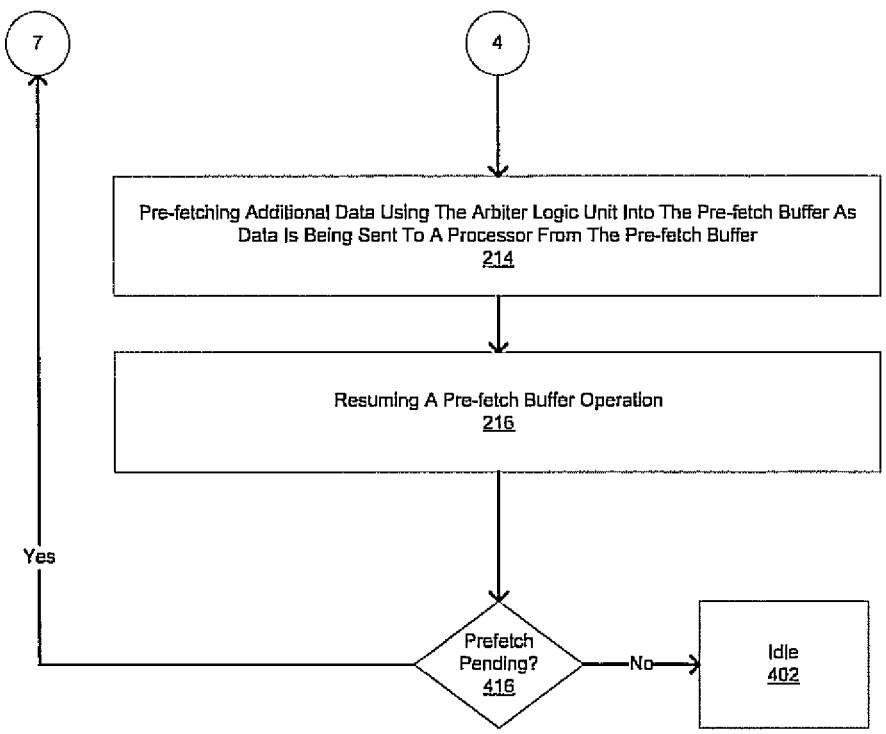
Figure 4B:
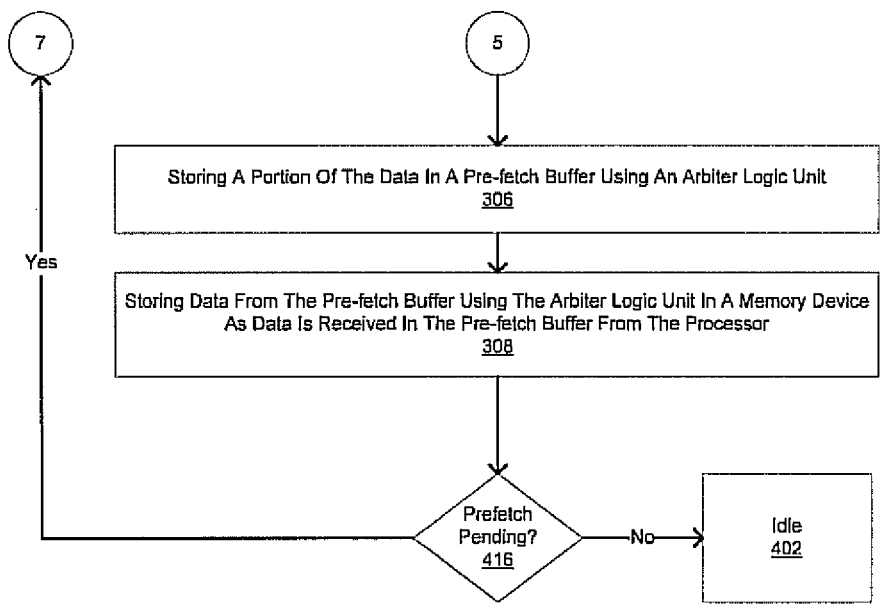

FIGS. 4A-4B show a flowchart 400 of exemplary operations of systems, in accordance with embodiments of the present invention. The blocks of flowchart 400 may be carried out with a plurality of devices such as a processor and memory or other devices and logic circuits in independent clock domains.

At block 402, the system is in an idle state. The system may arrive at this state after all requests have been serviced and no requests are currently pending. While the system is in an idle state, it waits for requests to be received.

At block 404, a check if any requests have been received is performed. As described herein, in one embodiment, the requests may be a read or write request made by a processor for data stored in a memory device. If no requests have been received, the system may return to an idle 402 state.

If a request has been made, at block 406, a check if the request was made by an external processor is performed. In one embodiment, as described herein, a request from an external processor may interrupt pending and in process pre-fetch operations.

At block 408, pending pre-fetch requests are resumed. As described herein, the order under which pending pre-fetch requests are resumed may be based on a hierarchy or policy.

At block 410, data is pulled into a pre-fetch buffer. As described herein, data may be pulled into a pre-fetch buffer from memory during the handling of read request. Similarly, data may be pulled into a pre-fetch buffer from a processor when a write request is received.

At block 412, a check as to whether a pre-fetch buffer is full is performed. If the pre-fetch buffer is not full, block 410 is performed, as described herein, and more data is pulled into the pre-fetch buffer.

If the pre-fetch buffer is full, at block 414, a check for a new request is performed. As described herein, data may be transferred out of the buffer and into memory or to the processor as long as the pre-fetch buffer does not become full. A check for a new request may be performed to service a request on another pre-fetch buffer. If there is no new request, the system may go to an idle 402 state. If there is a request, at block 406, the system may check if the request was made by an external processor and subsequent steps as described herein are performed to handle the new request.

If an external processor request is received, at block 202, a current pre-fetch operation is suspended. As described herein, a pre-fetch buffer read or write operation may be suspended upon receiving a signal from busy detection logic indicating that a processor is switching tasks.

At block 407, the request is checked to see if it is a read request. If the request is a read request, at block 206, data corresponding to the request for data is fetched into a pre-fetch buffer using an arbiter logic unit. As described herein, the data may be fetched from a memory device under the control of an arbiter logic unit into a pre-fetch buffer.

At block 208, the processor is signaled that the data is ready. As described herein, once sufficient data has been loaded into a pre-fetch buffer the processor is signaled that there is data ready to be retrieved.

At block 210, a request to read the data is received. As described herein, after signaling the processor the data is ready, the processor may signal (via memory interface logic) that it is ready to receive the data.

At block 212, data is sent to the processor from the pre-fetch buffer using the arbiter logic unit. As described herein, data begins to be sent from a pre-fetch buffer (via memory interface logic) to a processor under the control of the arbiter logic unit.

At block 214, additional data is pre-fetched (using the arbiter logic unit) into the buffer as data is sent from the pre-fetch buffer to the processor. As described herein, arbiter logic pre-fetches additional data to a pre-fetch buffer as data is sent to the processor (via memory interface logic) to complete the data transfer and ensure the pre-fetch buffer does not become empty.

At block 216, the interrupted pre-fetch buffer operation is resumed. As described herein, arbiter logic may resume the previously interrupted pre-fetch operation when the read request was received.

At block 416, a check if there are any pending pre-fetch operations is performed. If there are no pending pre-fetch operations, the system may go to an idle 402 state. If there are pending requests, the system may handle the next pending pre-fetch request and perform block 408.

If the request is determined to be a write request (result of block 407), at block 306, a portion of data is stored in a pre-fetch buffer using an arbiter logic unit. As described herein, under the control of arbiter logic the data portion of the request (e.g., write request) begins to be stored in a pre-fetch buffer.

At block 308, using the arbiter logic unit data from the pre-fetch buffer is stored in a memory device as data is received in the pre-fetch buffer from the processor. As described herein, arbiter logic starts writing to a memory device from the pre-fetch buffer while write data is being received from the processor into the pre-fetch buffer.

The system may then, at block 416, check if there are any pending pre-fetch operations. If there are no pending pre-fetch operations, the system may to go an idle 402 state. If there are pending requests, the system may handle the next pending pre-fetch request and perform block 408.

Thus, embodiments of the present invention provide a programmable asynchronous interface between devices without a common or synchronized clock. The present invention facilitates random access with a fixed minimum read and write latency for multiple clock domain operations. Thus, a substantial improvement in product performance, stability, and predictability is achieved.

Embodiments of the present invention are thus described. While the present invention has been described in particular embodiments, it should be appreciated that the present invention should not be construed as limited by such embodiments, but rather construed according to the below claims.

What is claimed is:

1. A bidirectional interface comprising:
 a bidirectional memory interface logic unit operable to receive memory access requests and corresponding information;
 a plurality of bi-directional pre-fetch buffers configured to handle memory accesses and coupled to said memory interface logic unit;
 a processor coupled to the memory interface logic unit and configured to pre-fetch data from pre-fetch buffers of said plurality of bi-directional pre-fetch buffers at a first frequency;
 an arbiter logic unit configured to pre-fetch data into said plurality of pre-fetch buffers wherein said plurality of pre-fetch buffers and said memory interface logic unit are both operable to communicate with a memory device, wherein said arbiter logic unit pre-fetches data at a second frequency that is faster than the first frequency; and
 busy detection logic configured to inform said arbiter logic unit of a current operation of said processor.

2. The interface as described in claim 1 wherein each of said plurality of buffers is operable to be configured as either an input or an output buffer.

3. The interface as described in claim 2 wherein any buffer of said plurality of buffers configured as an input buffer is further configured for write operations.

4. The interface as described in claim 2 wherein any buffer of said plurality of buffers configured as an output buffer is further configured for read operations.

5. The interface as described in claim 2 wherein buffer configuration of said plurality of buffers is performed at initialization.

6. The interface as described in claim 1 wherein said arbiter logic manages data transfers between said plurality of pre-fetch buffers and said memory device.

7. The interface as described in claim 1 wherein said arbiter logic manages service order of requests based on processor service requests, pending pre-fetch requests and simultaneous service requests.

8. The interface as described in claim 1 wherein said memory access request are for a Universal Serial Bus (USB) compliant device.

9. The interface as described in claim 8 wherein said arbiter logic unit handles zero-length packets.

10. The interface as described in claim 1 wherein said busy detection logic comprises independent busy detection logic for each pre-fetch buffer from a processor port.

11. The interface as described in claim 1 wherein said plurality of pre-fetch buffers are first in first out (FIFO) buffers.

12. The interface as described in claim 1 wherein said processor and said memory device are of different clock domains.

13. The interface as described in claim 1 wherein said arbiter logic unit suspends pre-fetch buffer operations when requests are received from said processor.

14. The interface as described in claim 13 wherein said arbiter logic unit resumes pre-fetch buffer operations.

15. The interface as described in claim 1 wherein said arbiter logic unit determines an order of pre-fetch buffer operations based on a buffer number.

16. A method for providing data stored in a memory device comprising:
   receiving a request for data stored in a memory device from a processor operating at a first frequency;
   fetching said data corresponding to said request for data into a pre-fetch buffer at the first frequency;
   pre-fetching other data using an arbiter logic unit, wherein said arbiter logic unit operates at a second frequency that is faster than the first frequency;
   signaling said processor that said data is ready;
   receiving a request to read said data; and
   sending data to said processor from said pre-fetch buffer using said arbiter logic unit at the second frequency.

17. The method as described in claim 16 further comprising:
   pre-fetching additional data using said arbiter logic unit into said pre-fetch buffer as data is being sent to said processor from said pre-fetch buffer.

18. The method as described in claim 16 further comprising:
   suspending a current pre-fetch buffer operation.

19. The method as described in claim 16 wherein said pre-fetch buffer corresponds to a memory location.

20. A method for storing data in a memory device comprising:
   receiving a write request from a processor comprising data to be stored in a memory device, the processor configured to pre-fetch data to a pre-fetch buffer at a first frequency;
   storing a portion of said data in said pre-fetch buffer using the processor at the first frequency;
   pre-fetching other data to said pre-fetch buffer using an arbiter logic unit operating at a second frequency that is faster than the first frequency; and
   storing data from said pre-fetch buffer in a memory device as data is received in said pre-fetch buffer from said processor using said arbiter logic unit at the second frequency.

21. The method as described in claim 20 further comprising:
   suspending a pre-fetch buffer operation.

22. The method as described in claim 20 further comprising:
   resuming a pre-fetch buffer operation.

* * * * *